United States Patent [19]

Rufenacht

[11] 3,857,840
[45] Dec. 31, 1974

[54] PYRIDO-1,2,3-TRIAZINES
[75] Inventor: Kurt Rufenacht, Basel, Switzerland
[73] Assignee: Ciba-Geigy Corporation, Ardsley, N.Y.
[22] Filed: Mar. 12, 1973
[21] Appl. No.: 340,430

[30] Foreign Application Priority Data
Mar. 24, 1972 Switzerland.................. 4373/72

[52] U.S. Cl............................. 260/248 AS, 424/249
[51] Int. Cl............................................ C07d 57/34
[58] Field of Search........................ 260/248 AS

[56] References Cited
UNITED STATES PATENTS
3,622,578  11/1971  Rigterink.......................... 260/248
3,682,910  8/1972  Collin................................. 260/248

*Primary Examiner*—John M. Ford
*Attorney, Agent, or Firm*—Frederick H. Rabin

[57] ABSTRACT

Organic phosphorus compounds of the formula

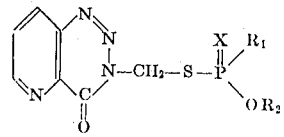

wherein
$R_1$ represents alkyl, alkoxy, alkenyloxy, alkynyloxy, alkoxyalkoxy, halogenoalkoxy, alkylthio, alkenylthio, alkoxyalkylthio, phenyl, amino, alkyl or dialkylamino,
$R_2$ represents alkyl, alkenyl, alkynyl, alkoxyalkyl or halogenoalkyl, and
X represents oxygen or sulphur, processes for their production and their use in pest control.

6 Claims, No Drawings

PYRIDO-1,2,3-TRIAZINES

The present invention relates to organic phosphorus compounds, to processes for their production, and to their use in pest control The organic phosphorus compounds correspond to the formula

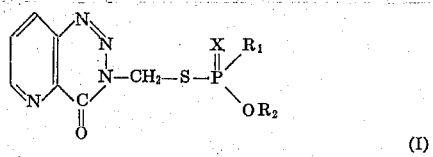

(I)

wherein
- $R_1$ represents alkyl, alkoxy, alkenyloxy, alkynyloxy, alkoxyalkoxy, halogenoalkoxy, alkylthio, alkenylthio, alkoxyalkylthio, phenyl, amino, alkyl or dialkylamino,
- $R_2$ represent alkyl, alkenyl, alkynyl, alkoxyalkyl or halogenoalkyl, and
- X represents oxygen or sulphur.

Halogen as substituent in the radicals $R_1$ and $R_2$ is fluorine, chlorine, bromine or iodine, preferably chlorine or bromine. Alkyl as substituent $R_1$ or $R_2$, or as part of such a substituent, contains 1 to 6, preferably 1 to 4, carbon atoms in a straight or branched chain. The following are given as examples: the methyl, ethyl, n-propyl, isopropyl, n-butyl, isobutyl, sec.-butyl and tert.-butyl radicals, as well as the n-pentyl and n-hexyl radicals and their isomers. Alkenyl and alkynyl radicals $R_2$ preferably contain 3 to 6 carbon atoms; the following are mentioned: allyl, methallyl, propargyl and n-butynyl radicals. Such radicals also form the alkenyl or alkynyl moiety of unsaturated radicals $R_1$.

compounds of formula I preferred because of their action are those wherein
- $R_1$ represents $C_1$–$C_2$-alkyl, $C_1$–$C_3$-alkoxy, $C_1$–$C_4$-alkylthio, $C_1$–$C_2$-alkoxy-$C_1$–$C_3$-alkoxy, $C_1$–$C_2$-alkoxy- $C_1$–$C_3$-alkythio or allylthio, $R_2$ represents $C_1$–$C_3$-alkyl or $C_1$–$C_2$-alkyloxy-$C_1$–$C_3$-alkyl, and
- X represents oxygen or sulphur.

Compounds of formula I particularly preferred, however, are those wherein
- $R_1$ represents methoxy, ethoxy or $C_1$–$C_3$-alkylthio,
- $R_2$ represents methyl or ethyl, and
- X represents oxygen or sulphur.

The ompounds of formula I are produced by methods known per se in that
a. a compound of the formula

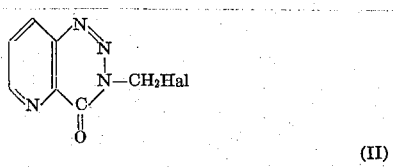

(II)

is reacted with a phosphorus compound of the formula

(III)

in the presence of an acid-binding agent; or
b. the compound of formula II is allowed to react with a compound of the formula

(IV)

In the formulae II to IV, the symbols $R_1$, $R_2$ and x have the meanings given for formula I, and Hal stands for chlorine or bromine, and Me for a monovalent metal, especially an alkali metal or ammonia.

The reactions a) and b) performed at normal pressure at temperatures of between 0° to 120°C, preferably at 10° to 70°C, and in solvents or diluents. These are in the first place lower aliphatic ketones such as acetone or methyl ethyl ketone; alkanols such as methanol, ethanol or isopropanol; esters such as acetic acid ethyl ester; nitriles such as acetonitrile; N-alkylated acid amides; aromatic and halogenated hydrocarbons such as benzene, toluene, chloroform or methylene chloride; ethers and ethereal compounds such as diethyl ether, dioxane or tetrahydrofuran; also water as well as mixtures of such solvents with each other and with water.

Acid-binding agents which can be used are: tertiary amines, e.g. trialkylamines, pyridine or dialkylanilines; inorganic bases such as hydrides or hydroxides; and carbonates and bicarbonates of alkali metals and alkaline-earth metals. It is sometimes necessary to use catalysts in the reactions, such as, e.g. copper and copper chloride.

The phosphorus compounds of formula III are in some cases known or can be produced by known processes.

The starting materials of formula II have not been described hitherto. They are produced by the conversion firstly of a compound of formula V

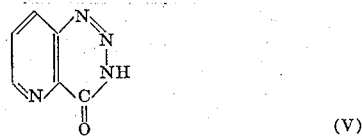

(V)

with formaldehyde into the corresponding 3-hydroxymethyl compound, and the subsequent reaction of this with a halogenating agent to the corresponding 3-halogenomethyl derivatives. The following are applicable as halogenating agents: thionyl chloride, phosphorus trichloride and phosphorus tribromide, phosphorus pentachloride and phosphorus pentabromide, phosphorus oxyhalides, etc.. Since in the case of these triazinones there is no occurrence of salt formation with the hydrogen halide splitting off, the addition of an acid-binding agent can be dispensed with.

These reactions are preferably performed in a solvent or diluent or in solvent mixtures, as described above.

The reaction temperatures are in the range of 0° to 120°C. The starting materials of formula II are obtained in good yield and with purity.

The compounds of formula I have a broad biocidal action, and can be used for the control of a wide variety of plant and animal pests.

The said compounds are particularly suitable for the control of insects of the families: Acrididae, Blattidae, Gryllidae, Gryllotalpidae, Tettigoniidae, Cimicidae, Phyrrhocoridae, Reduviidae, Aphididae, Delphacidae, Diaspididae, Pseudococcidae, Chrysomelidae, Coccinellidae, Bruchidae, Scarobaeidae, Dermestidae, Tenebrionidae, Curculionidae, Tineidae, Noctuidae, Lymantriidae, Pyralidae, Galleridae, Culicidae, Tipulidae, Stomoxydae, Muscidae, Calliphoridae, Trypetidae and Pulicidae; as well as acarids of the families: Ixodidae, Argasidae, Tetranychidae and Dermanyssidae.

The insecticidal or acaricidal action can be substantially broadened and adapted to suit the given circumstances by the addition of other insecticides and/or acaricides. Suitable additives are, for example, the following active substances:

Organic phosphorus compounds
  Bis-0,0-diethylphosphoric acid anhydride (TEPP)
  Dimethyl-(2,2,2-trichloro-1-hydroxyethyl)-phosphonate (TRICHLORFON)
  1,2-dibromo-2,2-dichloroethyldimethylphosphate (NALED)
  2,2-dichlorovinyldimethylphosphate (DICHLORVOS)
  2-methoxycarbamyl-1-methylvinyldimethylphosphate (MEVINPHOS)
  Dimethyl-1-methyl-2-(methylcarbamoyl)-vinylphosphate cis (MONOCROTOPHOS)
  3-(dimethoxyphosphinyloxy)-N,N-dimethyl-cis-crotonamide (DICROTOPHOS)
  2-chloro-2-diethylcarbamoyl-1-methylvinyldimethyl-phosphate (PHOSPHAMIDON)
  0,0-diethyl-0(or S)-2-(ethylthio)-ethylthiophosphate (DEMETON)
  S-ethylthioethyl-0,0-dimethyl-dithiophosphate (THIOMETON)
  0,0-diethyl-S-ethylmercaptomethyldithiophosphate (PHORATE)
  0,0-diethyl-S-2-(ethylthio)ethyldithiophosphate (DISULFOTON)
  0,0-dimethyl-S-2-(ethylsulphinyl)ethylthiophosphate (OXYDEMETON METHYL)
  0,0-dimethyl-S-(1,2-dicarbethoxyethyldithiophosphate (MALATHION) 0,0,0,0-tetraethyl-1-S,S'-methylene -bis-dithiophosphate (ETHION)
  0-ethyl-S,S-dipropyldithiophosphate
  0,0-dimethyl-S-(N-methyl-N-formylcarbomoylmethyl)-dithiophosphate (FORMOTHION)
  0,0-dimethyl-S-(N-methylcarbamoylmethyl)dithiophosphate (DIMETHOATE)
  0,0-dimethyl-0-p-nitrophenylthiophosphate (PARATHION-METHYL)
  0,0-diethyl-0-p-nitrophenylthiophosphate (PARATHION)
  0-ethyl-0-p-nitrophenylphenylthiophosphate (EPN)
  0,0-dimethyl-0-(4-nitro-m-tolyl) thiophosphate (FENITROTHION)
  0,0-dimethyl-0-2,4,5-trichlorophenylthiophosphate (RONNEL)
  0-ethyl-0,2,4,5-trichlorophenylethylthiophosphate (TRICHLORONATE)
  0,0-dimethyl-0-2,5-dichloro-4-bromophenylthiophosphate (BROMOPHOS)
  0,0-dimethyl-0-(2,5-dichloro-4-iodophenyl)-thiophosphate (JODOFENPHOS)
  4-tert. butyl-2-chlorophenyl-N-methyl-0-methylamidophosphate (CRUFOMATE)
  0,0-dimethyl-0-(3-methyl-4-methylmercaptophenyl) thiophosphate (FENTHION)
  Isopropylamino-0-ethyl-0-(4-methylmercapto-3-methylphenyl)-phosphate
  0,0-diethyl-0-p-(methylsulphinyl)phenyl-thiophosphate (FENSULFOTHION)
  0-p-(dimethylsulphamido)phenyl-0,0-dimethylthiophosphate (FAMPHUR)
  0,0,0',0'-tetramethyl-0,0'-thiodi-p-phenylenethiophosphate
  0-ethyl-S-phenyl-ethyldithiophosphate
  0,0-dimethyl-0-(α-methylbenzyl-3-hydroxycrotonyl)phosphate
  2-chloro-1-(2,4-dichlorophenyl)vinyl-diethylphosphate (CHLORFENVINPHOS) 2-chloro-1-(2,4,5-trichlorophenyl) vinyl-dimethylphosphate
  0-[2-chloro-1-(2,5-dichlorophenyl)]vinyl-0,0-diethylthiophosphate
  Phenylglyoxylonitriloxime-0,0-diethylthiophosphate (PHOXIM)
  0,0-diethyl-0-(3-chloro-4-methyl-2-oxo-2-h-1-benzopyran-7-yl)thiophosphate (COUMAPHOS)
  2,3-p-dioxandithiol-S,S-bis(0,0-diethyldithiophosphate) (DIOXATHION)
  5-[(6-chloro-2-oxo-3-benzoxazolinyl)methyl)]0,0-diethyldithiophosphate (PHOSALONE)
  2-(diethoxyphosphinylimino)-1,3-dithiolane
  0,0-dimethyl-S-[2-methoxy-1,3,4-thiadiazol-5-(4H)-onyl-(4)methyl]dithiophosphate
  0,0-dimethyl-S-phthalimidomethyl-dithiophosphate (IMIDAN)
  0,0-diethyl-0-(3,5,6-trichloro-2-pyridyl)thiophosphate
  0,0-diethyl-0-(3,5,6-trichloro-2-pyridyl)thiophosphate
  0,0-diethyl-0-2-pyrazinylthiophosphate (THIONAZIN)
  0,0-diethyl 0-(2-isopropyl-4-methyl-6-pyrimidyl)thiophosphate (DIAZINON)
  0,0-diethyl-0-(2-quinoxalyl)thiophosphate
  0,0-dimethyl-S-(4-oxo-1,2,3-benzotriazin-3(4H)-ylmethyl)-dithiophosphate (AZINPHOSMETHYL)
  0,0-diethyl-S- (4-oxo-1,2,3-benzotriazin-3(4H)-ylmethyl)-dithiophosphate (AZINPHOSETHYL)
  S-[(4,6-diamino-s-triazin-2-yl)methyl]-0,0-dimethyldithiophosphate (MENAZON)
  0,0-dimethyl-0-(3-chloro-4-nitrophenyl)thiophosphate (CHLORTHION)
  0,0-dimethyl-0(or S)-2-(ethylthioethyl)thiophosphate (DEMETON-S-METHYL) 2-(0,0-dimethyl-phosphoryl-thiomethyl)-5-methoxy-pyrone-4-3,4-dichlorobenzyl-triphenylphosphoniumchloride
  0,0-diethyl-S-(2,5-dichlorophenylthiomethyl)dithiophosphate (PHENKATON)
  0,0-diethyl-0-(4-methyl-cumarinyl -7-)-thiophosphate (POTASAN)
  5-amino-bis(dimethylamido)phosphinyl-3-phenyl-1,2,4-triazole (TRIAMIPHOS)
  N-methyl-5-(0,0-dimethylthiolphosphoryl)-3-thiavaleramide (VAMIDOTHION)
  0,0-dethyl-0-[2-dimethylamino-4-methylpyrimidyl-(6)]-thiophosphate (DIOCTHYL)
  0,0-dimethyl-S-(methylcarbamoylmethyl)-thiophosphate (OMETHOATE)
  0-ethyl-0-(8-quinolinyl)-phenylthiophosphonate (OXINOTHIOPHOS)
  0-methyl-S-methyl-amidothiophosphate (MONITOR)
  0-methyl-0-(2,5-dichloro-4-bromophenyl)-benzothiophosphate (PHOSVEL)
  0,0,0,0-tetrapropyldithiophosphate
  3-(dimethoxyphosphinyloxy)-N-methyl-N-methoxy-cis-crotonamide 0,0-dimethyl-S-(N-ethylcarbamoylmethyl)dithiophosphate (ETHOATE-METHYL)
0,0-diethyl-S-(N-isopropylcarbamoylmethyl)-dithiophosphate (PROTHOATE)
S-N-(1-cyano-1-methylethyl)carbamoylmethyldiethylthiolphosphate (CYANTHOATE)
S-(2-acetamidoethyl-0,0-dimethyldithiophosphate
Hexamethylphosphoric acid triamide (HEMPA)
0,0-dimethyl-0-(2-chloro-4-nitrophenyl)thiophosphate (DICAPTHON)
0,0-dimethyl-0-p-cyanophenyl thiophosphate (CYANOX) 0-ethyl-0-p-cyanophenylthiophosphonate
0,0-diethyl-0-2,4-dichlorophenylthiophosphate (DICHLORFENTHION)
0,2,4-dichlorophenyl-0-methylisopropylamidothiophosphate
0,0-diethyl-0-2,5-dichloro-4-bromophenylthiophosphate (BROMOPHOS-ETHYL)
dimethyl-p-(methylthio)phenylphosphate
0,0-dimethyl-0-sulphamidophenylthiophosphate
0-[p-(p-chlorophenyl)azophenyl]0,0-dimethylthiophosphate (AZOTHOATE)
0-ethyl-S-4-chlorophenyl-ethyldithiophosphate
0-isobutyl-S-p-chlorophenyl-ethyldithiophosphate
0,0-dimethyl-S-p-chlorophenylthiophosphate
0,0-dimethyl-S-(p-chlorophenylthiomethyl)dithiophosphate
0,0-diethyl-p-chlorophenylmercaptomethyl-dithiophosphate (CARBOPHENOTHION)
0,0-diethyl-S-p-chlorophenylthiomethyl-thiophosphate
0,0dimethyl-S-(carbethoxy-phenylmethyl)dithiophosphate (PHENTHOATE)
0,0-diethyl-S-(carbofluorethoxy-phenylmethyl)-dithiophosphate
0,0-dimethyl-S-carboisopropoxy-phenylmethyl)-dithiophosphate
0,0-diethyl-7-hydroxy-3,4-tetramethylene-coumarinyl-thiophosphate (COUMITHOATE)
2-methoxy-4-H-1,3,2-benzodioxaphosphorin-2-sulphide
0,0-diethyl-0-(5-phenyl-3-isooxazolyl)thiophosphate
2-(diethoxyphosphinylimino)-4-methyl-1,3-dithiolane
tris-(2-methyl-1-aziridinyl)phosphine oxide (METEPA)
S-(2-chloro-1-phthalimidoethyl)-0,0-diethyldithiophosphate
N-hydroxynaphthalimido-diethylphosphate
dimethyl-3,5,6-trichloro-2-pyridylphosphate
0,0-dimethyl-0-(3,5,6-trichloro-2-pyridyl)thiophosphate
S-2-(ethylsulphonyl)ethyl dimethylthiolphosphate (DIOXYDEMETON-S-METHYL)
diethyl-S-2-(ethylsulphinyl)ethyl dithiophosphate (OXIDISULFOTON)
bis-0,0-diethylthiophosphoric acid anhydride (SULFOTEP)
dimethyl-1,3-di(carbomethoxy)-1-propen-2-yl-phosphate
dimethyl-(2,2,2-trichloro-1-butyroyloxyethyl)phosphate (BUTONATE)
0,0-dimethyl-0-(2,2-dichloro-1-methoxy-vinyl)phosphate
bis-(dimethylamido)fluorphosphate (DIMEFOX)
3,4-dichlorobenzyl-triphenylphosphoniumchloride dimethyl-N-methoxymethylcarbamoylmethyl-dithiophosphate (FORMOCARBAM)
0,0-diethyl-0-(2,2-dichloro-1-chloroethoxyvinyl)-phosphate
0,0-dimethyl-0-(2,2-dichloro-1-chloroethoxyvinyl)-phosphate
0-ethyl-S,S-diphenyldithiolphosphate
0-ethyl-S-benzyl-phenyldithiophosphonate
0,0-diethyl-S-benzyl-thiolphosphate
0,0-dimethyl-S-(4-chlorophenylthiomethyl)dithiophosphate (METHYLCARBOPHENOTHION)
0,0-dimethyl-S-(ethylthiomethyl)dithiophosphate
diisopropylaminofluorophosphate (MIPAFOX)
0,0-dimethyl-S-(morpholinylcarbamoylmethyl)dithiophosphate (MORPHOTHION)
bismethylamido-phenylphosphate
0,0-dimethyl-S-(benzenesulphonyl)dithiophosphate
0,0-dimethyl-(S and 0)-ethylsulphinylethylthiophosphate
0,0-diethyl-0-4-nitrophenylphosphate
triethoxy-isopropoxy-bis(thiophosphinyl)disulphide
2-methoxy-4H-1,3,2-benzodioxaphosphorin-2-oxide
octamethylpyrophosphoramide (SCHRADAN)
bis-(dimethoxythiophosphinylsulphido)-phenylmethane
N,N,N',N'-tetramethyldiamidofluorophosphate (DIMEFOX)
0-phenyl-0-p-nitrophenyl-methanethiophosphonate (COLEP)
0-methyl-0-(2-chloro-4-tert.butyl-phenyl)-N-methylamidothiophosphate (NARLENE)
0-ethyl-0-(2,4-dichlorophenyl)-phenylthiophosphonate
0,0-diethyl-0-(4-methylmercapto-3,5-dimethylphenyl)-thiophosphate
4,4'-bis-(0,0-dimethylthiophosphoryloxy)-diphenyl disulphide
0,0-di-(β-chloroethyl)-0-(3-chloro-4-methyl-coumarinyl-7)-phosphate
S-(1-phthalimidoethyl)-0,0-diethyldithiophosphate
0,0-dimethyl-0-(3-chloro-4-diethylsulphamylphenyl)-thiophosphate
0-methyl-0-(2-carbisopropoxyphenyl)-amidothiophosphate
5-(0,0-dimethylphosphoryl)-6-chloro-bicyclo(3.2.0)-heptadiene(1,5)
0-methyl-0-(2-i-propoxycarbonyl-1-methylvinyl)-ethylamidothiophosphate.

Nitrophenols and derivatives
4,6-dinitro-6-methylphenol, sodium salt [Dinitrocresol]
dinitrobutylphenol-(2,2',2'')-triethanolamine salt
2-cyclohexyl-4,6-dinitrophenyl [Dinex]
2-(1-methylheptyl)-4,6-dinitrophenyl-crotonate [Dinocap]
2-sec.-butyl-4,6-dinitrophenyl-3-methyl-butenoate [Binapacryl]
2-sec.-butyl-4,6-dinitrophenyl-cyclopropionate
2-sec.-butyl-4,6-dinitrophenylisopropylcarbonate [Dinobuton]

Miscellaneous
pyrethin I
pyrethin II
3-allyl-2-methyl-4-oxo-2-cyclopentan-1-yl-chrysanthemumate (Allethrin)
6-chloropiperonyl-chrysanthemumate (Barthrin)
2,4-dimethylbenzyl-chrysanthemumate (Dimethrin)

2,3,4,5-tetrahydrophthalimidomethylchrysanthemumate
4-chlorobenzyl-4-chlorophenylsulphide [Chlorobensid]
6-methyl-2-oxo-1,3-dithiolo-[4,5-b]-quinoxaline (Quinomethionate)
(I)-3-(2-furfuryl)-2-methyl-4-oxocyclopent-2-enyl(I)-(cis+trans)-chrysanthemum-monocarboxylate [Furethrin]
2-pivaloyl-indane-1,3-dione [Pindon]
N'-(4-chloro-2-methylphenyl)-N,N-dimethylformamidine [Chlorophenamidin]
4-chlorobenzyl-4-fluorophenyl-sulphide [Fluorobenside]
5,6-dichloro-1-phenoxycarbamyl-2-trifluoromethyl-benzimidazole [Fenozaflor]
p-chlorophenyl-p-chlorobenzenesulphonate [Ovex]
p-chlorophenyl-benzenesulphonate [Fenson]
p-chlorophenyl-2,4,5-trichlorophenylsulphone [Tetradifon]
p-chlorophenyl-2,4,5-trichlorophenylsulphide [Tetrasul]
p-chlorobenzyl-p-chlorophenylsulphide [Chlorobenside]
2-thio-1,3-dithiolo-(5,6)-quinoxaline [Thiochinox]
prop-2-ynyl-(4-t-butylphenoxy)-cyclohexylsulphite [Progargil].

Formamidines
  1-dimethyl-2-(2'-methyl-4'-chlorophenyl)-formamidine (CHLORODIMEFORM)
  1-methyl-2-(2'-methyl-4'-chlorophenyl)-formamidine
  1-methyl-2-(2'-methyl-4'-bromophenyl)-formamidine
  1-methyl-2-(2',4'-dimethylphenyl)-formamidine
  1-n-butyl-1-methyl-2-(2'-methyl-4'-chlorophenyl)-formamidine
  1-methyl-1-(2'-methyl-4'-chloroaniline-methylene)-formamidine
  2-(2''-methyl-4''-chlorophenyl-formamidine
  1-n-butyl-2-(2'-methyl-4'-chlorophenyl-imino)-pyrolidine.

Urea
  N-2-methyl-4-chlorophenyl-N',N'-dimethyl-thiourea.

Carbamates
  1-naphthyl-N-methylcarbamate (CARBARYL)
  2-butinyl-4-chlorophenylcarbamate
  4-dimethylamino-3,5-xylyl-N-methylcarbamate
  4-dimethylamino-3-tolyl-N-methylcarbamate (AMINOCARB)
  4-methylthio-3,5-xylyl-N-methylcarbamate (METHIOCARB)
  3,4,5-trimethylphenyl-N-methylcarbamate
  2-chlorophenyl-N-methylcarbamate (CPMC)
  5-chloro-6-oxo-2-norborane-carbonitrile-0-(methylcarbomoyl)-oxime
  1-(dimethylcarbamoyl)-5-methyl-3-pyrazolyl-N,N-dimethylcarbamate (DIMETILAN)
  2,3-dihydro-2,2-dimethyl-7-benzofuranyl-N-methylcarbamate (CARBOFURAN)
  2-methyl-2-methylthio-propionaldehyde-0-(methylcarbamoyl)-oxime (ALDICARB)
  8-quinaldyl-N-methylcarbamate and its salts
  methyl-2-isopropyl-4-(methylcarbamoyloxy)carbanilate
  m-(1-ethylpropyl)phenyl-N-methylcarbamate
  3,5-di-tert.butyl-N-methylcarbamate
  m-(1-methylbutyl)phenyl-N-methylcarbamate
  2-isopropylphenyl-N-methylcarbamate
  2-sec.butylphenyl-N-methylcarbamate
  m-tolyl-N-methylcarbamate
  2,3-xylyl-N-methylcarbamate
  3-isopropylphenyl-N-methylcarbamate
  3-tert.butylphenyl-N-methylcarbamate
  3-sec.butylphenyl-N-methylcarbamate
  3-isopropyl-5-methylphenyl-N-methylcarbamate (PROMECARB)
  3,5-diisopropylphenyl-N-methylcarbamate
  2-chloro-5-isopropylphenyl-N-methylcarbamate
  2-chloro-4,5-dimethylphenyl-N-methylcarbamate
  2-(1,3-dioxolan-2-yl)phenyl-N-methylcarbamate (DIOXACARB)
  2-(4,5-dimethyl-1,3-dioxolan-2-yl)phenyl-N-methylcarbamate
  2-(1,3-dioxolan-2-yl)phenyl-N,N-dimethylcarbamate
  2-(1,3-dithiolan-2-yl)-N,N-dimethylcarbamate
  2-(1,3-dithiolan-2-yl)phenyl-N,N-dimethylcarbamate
  2-isopropoxyphenyl-N-methylcarbamate (APROCARB)
  2-(2-propinyloxy)phenyl-N-methylcarbamate
  3-(2-propinyloxy)phenyl-N-methylcarbamate
  2-dimethylaminophenyl-N-methylcarbamate
  2-diallylaminophenyl-N-methylcarbamate
  4-diallylamino-3,5-xylyl-N-methylcarbamate (ALLYXICARB)
  4-benzothienyl-N-methylcarbamate
  2,3-dihydro-2-methyl-7-benzofuranyl-N-methylcarbamate
  3-methyl-1-phenylpyrazol-5-yl-N,N-dimethylcarbamate
  1-isopropyl-3-methylpyrazol-5-yl-N,N-dimethylcarbamate (ISOLAN)
  2-dimethylamino-5,6-dimethylpyrimidin-4-yl-N,N-dimethyl-carbamate
  3-methyl-4-dimethylaminomethyleneiminophenyl-N-methylcarbamate
  3,4-dimethylphenyl-N-methylcarbamate
  2-cyclopentylphenyl-N-methylcarbamate
  3-dimethylamino-methyleneiminophenyl-N-methylcarbamate (FORMETANATE) and its salts
  1-methylthio-ethylimino-N-methylcarbamate (METHOMYL)
  2-methylcarbamoyloximino-1,3-dithiolane
  5-methyl-2-methylcarbamoyloximino-1,3-oxythiolane
  2-(1-methoxy-2-propoxy)phenyl-N-methylcarbamate
  2-(1-butin-3-yl-oxy)phenyl-N-methylcarbamate
  1-dimethylcarbamyl-1-1-methylthio-0-methylcarbamyl-formoxime
  1-(2'-cyanoethylthio)-0-methylcarbamyl-acetaldoxime
  1-methylthio-0-carbamyl-acetaldoxime
  0-(3-sec.butylphenyl)-N-phenylthio-N-methylcarbamate
  2,5-dimethyl-1,3-dithiolane-2-(0-methylcarbamyl)-aldoxime)
  0-2-diphenyl-N-methylcarbamate
  2-(N-methylcarbamyl-oximino)-3-chloro-bicyclo[2.2.1]heptane 2-(N-methylcarbamyl-oximino)-bicyclo[2.2.1]heptane
3-isopropylphenyl-N-methyl-N-chloroacetal-carbamate
3-isopropylphenyl-N-methyl-N-methylthiomethyl-carbamate
0-(2,2-dimethyl-4-chloro-2,3-dihydro-7-benzofuranyl)-N-methylcarbamate
0-(2,2,4-trimethyl-2,3-dihydro-7-benzofuranyl)-N-methylcarbamate
0-naphthyl-N-methyl-N-acetal-carbamate
0-5,6,7,8-tetrahydronaphthyl-N-methyl-carbamate
3-isopropyl-4-methylthio-phenyl-N-methylcarbamate
3,5-dimethyl-4-methoxy-phenyl-N-methylcarbamate
3-methoxymethoxy-phenyl-N-methylcarbamate
3-allyloxyphenyl-N-methylcarbamate
2-propargyloxymethoxy-phenyl-N-methyl-carbamate
2-allyloxyphenyl-N-methyl-carbamate
4-methoxycarbonylamino-3-isopropylphenyl-N-methyl-carbamate
3,5-dimethyl-4-methoxycarbonylamino-phenyl-N-methyl-carbamate
2-γ-methylthiopropylphenyl-N-methyl-carbamate
3-(α-methoxymethyl-2-propenyl)-phenyl-N-methyl-carbamate
2-chloro-5-tert.-butyl-phenyl-N-methyl-carbamate
4-(methyl-propargylamino-3,5-xylyl-N-methyl-carbamate
4-(methyl-γ-chloroallylamino)-3,5-xylyl-N-methyl-carbamate
4-(methyl-β-chloroallylamino)-3,5-xylyl-N-methyl-carbamate
1-(β-ethoxycarbonylethyl)-3-methyl-5-pyrazolyl-N,N-dimethylcarbamate
3-methyl-4-(dimethylamino-methylmercapto-methyleneimino)phenyl-N-methylcarbamate
1,3-bis(carbamoylthio)-2-(N,N-dimethylamino)-propanehydrochloride
5,5-dimethylhydroresorcinoldimethylcarbamate
2-[ethyl-propargylamino]-phenyl-N-methylcarbamate
2-[methyl-propargylamino]-phenyl-N-methylcarbamate
2-[dipropargylamino]-phenyl-N-methylcarbamate
4-[dipropargylamino]-3-tolyl-N-methylcarbamate
4-[dipropargylamino]-3,5-xylyl-N-methylcarbamate
2-[allyl-isopropylamino]-phenyl-N-methylcarbamate
3-[allyl-isopropylamino]-phenyl-N-methylcarbamate Chlorinated Hydrocarbons
γ-hexachlorocyclohexane [GAMMEXANE; LINDAN; γ HCH]
1,2,4,5,6,7,8,8-octachloro-3α,4,7,7α'tetrahydro-4,7-methylene indane [CHLORDAN]
1,4,5,6,7,8,8-heptachloro,3α,4,7,7α-tetrahydro-4,7-methylene indane [HEPTACHLOR]
1,2,3,4,10,10-hexachloro-1,4,4α,5,8,8α-hexahydro-endo-1,4-exo-5,8-dimethanonaphthalene [ALDRIN]
1,2,3,4,10,10-hexachloro-6,7-epoxy-1,4,4α,5,6,7,8,8α-octahydro-exo-1,4-endo-5,8-dimethanonaphthalene [DIELDRIN]
1,2,3,4,10,10-hexachloro-5,7-epoxy-1,4,4α,5,6,7,8,8α-octahydro-endo-endo-5,8-dimethanonaphthalene [ENDRIN].

In addition to possessing the above mentioned properties, the compounds of formula I are also effective against members of the division Thallophyta. Some of these compounds thus have a bactericidal action. They are particularly effective, however, against fungi, especially against phytopathogenic fungi belonging to the following classes: Oomycetes, Zygomycetes, Ascomycetes, Basidiomycetes and Denteromycetes. The compounds of formula I have moreover a fungitioxic action in the case of fungi which attack plants from the soil. Furthermore, the new active substances are suitable for the treatment of seeds, fruits, tubers, and so forth, to obtain protection against fungus infections. The compounds of formula I are suitable also for the control of phytopathogenic nematodes.

The compounds of formula I can be used on their own or together with suitable carriers and/or additives. Suitable carriers and additives may be solid or liquid, and correspond to the substances common in formulation pratice, such as, e.g. natural and regenerated substances, solvents, dispersing agents, wetting agents, adhesives, thickeners, binders and/or fertilisers.

For application, the compounds of formula I can be processed into the form of dusts, emulsion concentrates, granulates, dispersions, sprays, or solutions, the formulation of these preparations being effected in a manner commonly known in practice. Also to be mentioned are cattle dips and spray races, in which aqueous preparations are used.

The agents according to the invention are produced in a manner known per se by the intimate mixing and-/or grinding of active substances of formula I with the suitable carriers, optionally with the addition of dispersing agents or solvents which are inert to the active substances. The active substances can be obtained and used in the following preparation forms:

solid preparations: dusts, scattering agents, granulates, coated granulates, impregnated granulates and homogeneous granulates;
liquid preparations:
a. water dispersible active substance concentrates: wettable powders, pastes, emulsions;
b. solutions.

The solid preparations (dusts, scattering agents) are produced by the mixing of the active substances with solid carriers. Suitable carriers are, e.g. kaolin, talcum, bole, loess, chalk, limestone, ground limestone, attapulgite, dolomite, diatomaceous earth, precipitated silicic acid, alkaline-earth silicates, sodium and potassium aluminium silicates (feldspar and mica), calcium and magnesium sulphates, magnesium oxide, ground synthetic materials, fertilisers such as ammonium sulphate, ammonium phosphate, ammonium nitrate, urea, ground vegetable products such as bran, bark dust, sawdust, ground nutshells, cellulose powder, residues of plant extractions, active charcoal, etc., alone or in admixture with each other.

Granulates can be very easily prepared by a process in which an active substance of formula I is dissolved in an organic solvent, the thus obtained solution applied to a granulated mineral, e.g. attapulgite, $SiO_2$, granicalcium, bentonite, etc., and the organic solvent then evaporated off.

It is possible also to produce polymer granulates; in this case the active substances of formula I are mixed with polymerisable compounds (urea/formaldehyde; dicyandiamide/formaldehyde; melamine/formaldehyde, or others); polymerisation is then carefully carried out in a manner which leaves the active substances unaffected, and granulation performed actually during the gel forming process. It is more favourable, however, to impregnate finished porous polymer granules (urea/-formaldehyde, polyacrylonitrile, polyester and others), having a specific surface area and a favourable predeterminable adsorption/desorption ratio, with the active substances, e.g. in the form of their solutions (in a low-boiling solvent), and to then remove the solvent. Polymer granulates of this kind can be also sprayed in the form of microgranulates, having bulk weights of preferably 300 g/litre to 600 g/litre, with the aid of spray apparatus. Spraying can be carried out over extensive areas of useful plant crops by the use of aeroplanes.

Granulates can also be obtained by the compacting of the carrier material with the active substances and additives, and a subsequent reducing operation.

Moreover, it is possible to add to these mixtures additives stabilising the active substance and/or nonionic, anion-active and cation-active substances which improve, e.g. the adhesiveness of the active substances on plants and parts of plants (adhesives and agglutinants), and/or ensure a better wettability (wetting agents) as well as dispersibility (dispersing agents).

The following substances are, for example, suitable: olein/lime mixture, cellulose derivatives (methyl cellulose, carboxymethyl cellulose), hydroxyethylene glycol ethers of monoalkyl and dialkyl phenols having 5 to 15 ethylene oxide radicals per molecule and 8 to 9 carbon atoms in the alkyl radical, ligninsulphonic acid, the alkali metal and alkaline-earth metal salts thereof, polyethylene glycol ethers (carbowaxes), fatty alcohol polyglycol ethers having 5 to 20 ethylene oxide radicals per molecule and 8 to 18 carbon atoms in the fatty alcohol moiety, condensation products of ethylene oxide, propylene oxide, polyvinylpyrrolidones, polyvinyl alcohols, condensation products of urea and formaldehyde, as well as latex products.

Water-dispersible concentrates of active substances, i.e., wettable powders, pastes and emulsion concentrates, are agents which can be diluted with water to obtain any desired concentration. They consist of active substance, carrier, optionally additives which stabilise the active substance, surface-active substances, and anti-foam agents and, optionally, solvents.

The wettable powders and pastes ae obtained by the mixing and grinding of the active substances with dispersing agents and pulverulent carriers, in suitable devices, until homogeneity is obtained. Suitable carriers are, e.g. those previously mentioned in the case of solid preparations. It is advantageous in some cases to use mixtures of different carriers. As dispersing agents it is possible to use, e.g.: condensation products of suphonated napthalene and sulphonated napthalene derivatives with formaldehyde, condensation products of napthalene or of naphthalenesulphonic acids with phenol and formaldehyde, as well as alkali, ammonium and alkaline-earth metal salts of ligninsulphonic acid, also alkylarylsulphonates, alkali metal salts and alkaline-earth metal salts of dibutyl naphthalenesulphonic acid, fatty alcohol sulphates such as salts of sulphated hexadecanols, heptadecanols, octadecanols, and salts of sulphated fatty alcohol glycol ethers, the sodium salt of oleyl methyl tauride, ditertiary ethylene glycols, dialkyl dilauryl ammonium chloride, and fatty acid alkali-metal and alkaline-earth metal salts.

Suitable anti-foam agents are, e.g. silicones.

The active substances are so mixed, ground, sieved and strained with the above mentioned additives that the solid constituent in the case of wettable powders has a particle size not exceeding 0.02 to 0.04 mm, and in the case of pastes not exceeding 0.03 mm. For the preparation of emulsion concentrates and pastes, dispersing agents are used such as those mentioned in the preceeding paragraphs, organic solvents and water. Suitable solvents are, e.g. alcohols, benzene, xylene, toluene, dimethylsulphoxide, and mineral oil fractions boiling in the range of 120° to 350°C. The solvents must be practically odourless, nonphytotoxic, and inert to the active substances.

Furthermore, the agents according to the invention can be used in the form of solutions. For this purpose, the active substance, or several active substances, of the general formula I is dissolved in suitable organic solvents, solvent mixtures, or water. As organic solvents it is possible to use aliphatic and aromatic hydrocarbons, their chlorinated derivatives, alkylnaphthalenes, mineral oils on their own or in admixture with each other.

The content of active substance in the above described agents is between 0.1 and 95%; it is to be mentioned in this connection that in the case of application of the agents from an aeroplane, or by means of some other suitable application devices, concentrations of up to 99.5% can be used, or even the pure active substance.

The active substances of formula I can be prepared, e.g. as follows:

Dusts:

The following substances are used for the preparation of a) a 5% dust, and b) a 2% dust:
  a. 5 parts of active substance
  95 parts of talcum.
  b. 2 parts of active substance 1 part of highly dispersed silicic acid
  97 parts of talcum.

The active substances are mixed and ground with the carriers.

Granulate:

The following substances are used to produce a 5 % granulate:
  5 parts of active substance,
  0.25 parts of epichlorhydrin,
  0.25 parts of cetyl polyglycol ether,
  3.50 parts of polyethylene glycol,
  91 parts of kaolin (particle size 0.3 - 0.8 mm).

The active substance is mixed with epichlorhydrin and dissolved with 6 parts of acetone; the polyethylene glycol and cetyl polyglycol ether are then added. The thus obtained solution is sprayed on to kaolin, and the acetone subsequently evaporated in vacuo.

Wettable powder:

The following constituents are used for the preparation of a) a 40%, b) and c) a 25%, and d) a 10% wettable powder:
  a. 40 parts of active substance,
  5 parts of sodium lignin sulphonate,
  1 part of sodium dibutyl-naphthalene sulphonate,
  54 parts of silicic acid.
  b. 25 parts of active substance,
  4.5 parts of calcium lignin sulphonate
  1.9 parts of Champagne chalk/hydroxyethyl cellulose mixture (1:1),
  1.5 parts of sodium dibutyl naphthalene sulphonate, 19.5 parts of silicic acid,
19.5 parts of Champagne chalk,
28.1 parts of kaolin.
c. 25 parts of active substance,
2.5 parts of isooctylphenoxy-polyoxyethylene-ethanol,
1.7 parts of Champagne chalk/hydroxyethyl cellulose mixture (1:1),
8.3 parts of sodium aluminum silicate,
16.5 parts of kieselguhr,
46 parts of kaolin.
d). 10 parts of active substance,
3 parts of a mixture of the sodium salts of saturated fatty alcohol sulphates,
5 parts of naphthalenesulphonic acid/formaldehyde condensate,
82 parts of kaolin.

The active substances are intimately mixed, in suitable mixers, with the additives, the mixture being then ground in the appropriate mills and rollers. Wettable powders are obtained which can be diluted with water to give suspensions of any desired concentration.

Emulsifiable concentrates:

The following substances are used to produce a) a 10% and b) a 25% emulsifiable concentrate:
a. 10 parts of active substance,
3.4 parts of epoxidised vegetable oil,
13.4 parts of a combination emulsifier consisting of fatty alcohol polyglycol ether and alkylarylsulphonate calcium salt,
40 parts of dimethylformamide,
43.2 parts of xylene.
b. 25 parts of active substance,
2.5 parts of expoxidised vegetable oil,
10 parts of an alkylarylsuphonate/fatty alcoholpolyglycol ether mixture
5 parts of dimethylformamide,
57.5 parts of xylene.

From these concentrates it is possible to produce, by dilution with water, emulsions of any desired concentration.

Spray:

The following constituents are used to prepare a 5% spray:
5 parts of active substance,
1 part of epichlorhydrin,
94 parts of ligroin (boiling limits 160°–190°C).

EXAMPLE 1 a. A solution of 7 g of sodium nitrite in 30 ml of water is added at 10°C to a solution of 13.7 g of 3-aminopicolinic acid amide in 50 ml of 2N hydrochloric acid and 100 ml of water. The initially formed voluminous violet precipitate becomes paler when heated briefly at 60°C, becoming light-yellow in colour and coarsecrystalline in form. On cooling and filtration there is obtained the compound of the formula

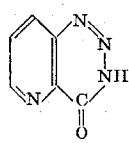

having a melting point of 230°C with decomposition.

| Analysis: | calculated: | C 48.64 | H 2.72 | N 37.82 % |
|---|---|---|---|---|
| | found: | C 48.62 | H 2.76 | N 37.81 % | b. an amount of 13 g of the compound of the formula

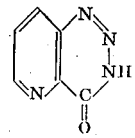

is dissolved, by heating, in 40 ml of 37% aqueous formaldehyde solution. The solution is filtered clear and 80 ml of water added to the filtrate.

Crystals are precipitated on cooling to 0°C. Filtration is performed and the compound of the formula

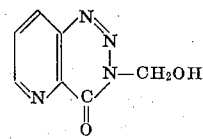

thus obtained, which decomposes above 140°C.

| Analysis: | calculated: | C 47.18 | H 3.40 | N 31.45 % |
|---|---|---|---|---|
| | found: | C 47.06 | H 3.34 | N 31.33 % | c. An amount of 8.9 g of the compound of the formula

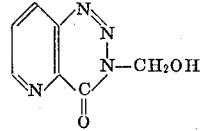

is suspended in 150 ml of chloroform. Additions are made of 0.5 ml of dimethylformamide and 13 g of thionyl chloride; the whole is then stirred for half an hour at room temperature, for six hours at 35°C, and finally for 1½hours at 60°C; it is subsequently concentrated by evaporation to dryness, and the residue recrystallised from ethyl acetate/petroleum ether. There is thus obtained 6.5 g of the compound of the formula

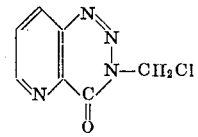

having a melting point of 137°–139°C.

| Analysis: | | | | | | | |
|---|---|---|---|---|---|---|---|
| calculated: | C | 42.77 | H | 2.57 | Cl | 18.04 | N 28.50% |
| found: | C | 42.71 | H | 2.53 | Cl | 18.20 | N 28.51% | d. 5.9 g of the compound of the formula

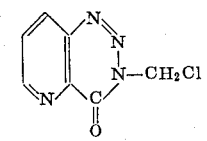

and 6 g of the ammonium salt of 0,0-dimethyl-dithiophosphoric acid are dissolved in 100 ml of acetone.

Stirring is performed for four hours at 35°C; the solvent is then evaporated off and 100 ml of water added to the residue. The precipitated oil is taken up in ethyl acetate, the organic phase washed with sodium bicarbonate solution and with water, dried, and concentrated by evaporation to obtain as residue 7 g of the compound of the formula

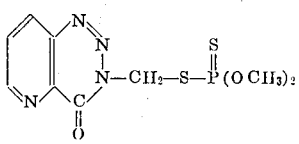

as light-brown oil. The product is recrystallised from methanol and then has a melting point of 68°– 70°C.

Analysis:

| calculated: | C 33.95 | H 3.49 | N 17.60 | P 9.75 | S 20.14% |
|---|---|---|---|---|---|
| found: | C 33.94 | H 3.56 | N 17.67 | P 9.69 | S 20.07% |

The analogously produced compound of the formula

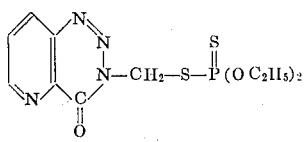

melts at 63°– 65°C.

Analysis:

| calculated: | C 38.14 | H 4.37 | N 16.17 | P 8.95 | S 18.52% |
|---|---|---|---|---|---|
| found: | C 37.97 | H 4.43 | N 16.22 | P 8.93 | S 18.75% |

EXAMPLE 2

20 g of the compound of the formula

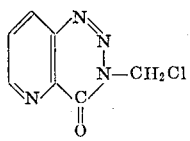

and 30 g of the potassium salt of O-ethyl-S-propyl-dithiophosphoric acid are refluxed in 50 ml of methanol for 10 minutes. The solvent is then evaporated off and 100 ml of water added to the residue. The precipitated oil is taken up in ethyl acetate, the organic phase washed with sodium bicarbonate solution and with water, dried and concentrated by evaporation. The oil remaining behind is boiled with 150 ml of ether. The ether is decanted off and trituration performed with petroleum ether. The crystalline solidifying product has a melting point of 43°– 50°C and corresponds to the formula

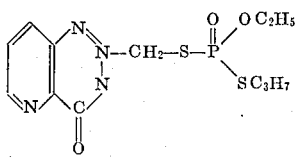

Analysis:

| calculated: | C 40.0 | H 4.8 | N 15.5 | P 8.6 | S 17.8 % |
|---|---|---|---|---|---|
| found: | C 39.5 | H 4.6 | N 15.3 | P 8.1 | S 16.9 % |

In the following table are listed compounds of the formula

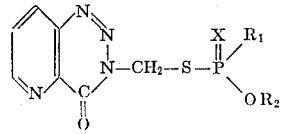

which are obtained by processes analogous to those described in the examples.

| $R_1$ | $R_2$ | X |
|---|---|---|
| $OCH_3$ | $CH_3$ | O |
| $OC_2H_5$ | $C_2H_5$ | O |
| $OC_3H_7(iso)$ | $C_3H_7(iso)$ | S |
| $OC_3H_7(n)$ | $C_3H_7(n)$ | S |
| $OC_2H_4OCH_3$ | $C_2H_4OCH_3$ | S |
| $OCH_2\text{-}CH=CH_2$ | $CH_2\text{-}CH=CH_2$ | S |
| $OC_2H_4Cl$ | $C_2H_4Cl$ | S |
| $C_6H_5$ | $CH_3$ | S |
| $C_6H_5$ | $C_2H_5$ | S |
| $CH_3$ | $CH_3$ | S |
| $CH_3$ | $C_2H_5$ | S |
| $C_2H_5$ | $CH_3$ | S |
| $C_2H_5$ | $C_2H_5$ | S |
| $N(CH_3)_2$ | $CH_3$ | S |
| $N(CH_3)_2$ | $C_2H_5$ | S |
| $NHCH_3$ | $C_2H_5$ | O |
| $NH_2$ | $C_2H_5$ | O |
| $SCH_3$ | $CH_3$ | O |
| $SC_2H_5$ | $CH_3$ | O |
| $SC_3H_7(n)$ | $CH_3$ | O |
| $SC_2H_5$ | $C_2H_5$ | O |
| $SC_4H_9(n)$ | $C_2H_5$ | O |
| $SC_4H_9(iso)$ | $C_2H_5$ | O |
| $SC_5H_{11}(iso)$ | $C_2H_5$ | O |
| $SCH_2\text{-}CH=CH_2$ | $C_2H_5$ | O |
| $SC_2H_4OC_2H_5$ | $C_2H_5$ | O |

EXAMPLE 3

A. Insecticidal stomach poison action

Cotton and potato plants were sprayed with a 0.05% aqueous active-substance emulsion (obtained from a 10% emulsifiable concentrate).

After the drying of the obtained coating, *Spodoptera litoralis* or *Helicothis virscens* larvae $L_3$ were placed onto the cotton plants, and Colorada beetle larvae (*Leptinotarsa decemlineata*) onto the potato plants. The test was carried out at 24°C with 60% relative humidity.

The compounds according to Example 1 exhibited in the above test a good insecticidal stomach poison action against *Spodoptera litoralis, Heliothis* and *Leptinotarsa decemlineata* larvae.

b. Systemic insecticidal action

In order to determine the systemic action, rooted bean plants (*Vicia faba*) were placed into a 0.01% aqueous active-substance solution (obtained from a 10% emulsifiable concentrate). After a period of 24 hours, bean aphids (*Aphis fabae*) were placed onto the parts of the plants above the soil. The insects were protected by a special device from the effects of contact and of gas. The test was carried out at 24°C with 70% relative humidity.

In the above tests, the compounds according to Example 1 exhibited a systemic action against *Aphis fabae*.

EXAMPLE 4

Action against *Chilo suppressalis*

Rice plants of the type Caloro were planted, 6 plants per pot, in plastic pots having a top diameter of 17 cm, and grown to a height of ca. 60 cm. Infestation with Chilo suppressalis larvae ($L_1$; 3–4 mm long) was carried out 2 days after application of the active substance in granular form (amount applied = 8 kg of active substance per hectare) to the paddy water. The evaluation of the insecticidal action was made 10 days after application of the granules.

The compounds according to Example 1 were effective against *Chilo suppressalis* in the above test.

EXAMPLE 5

Action against ticks

A. *Rhipicephalus bursa*

In each case, 5 adult ticks or 50 tick larvae were placed into a small glass test tube, and the test tubes then immersed for 1 to 2 minutes in 2 ml of an aqueous emulsion from a dilution series of 100, 10, 1 and 0.1 ppm of test substance. The tubes were then sealed with a standardised cotton plug, and inverted so that the active substance emulsion could be absorbed by the cotton wool.

An evaluation in the case of the adults was made after 2 weeks, and in the case of the larvae after 2 days. There were two repeats for each test.

B. *Boophilus microplus* (larvae)

With a dilution series analogous to that in Test A, tests were carried out with 20 sensitive larvae and OP-resistant larvae, respectively (resistance is with respect to diazinon compatibility).

The compounds according to Example 1 were effective in these tests against adults and larvae of *Rhipicephalus bursa* and against sensitive and OP-resistant larvae, respectively, of *Boophilus microplus*.

EXAMPLE 6

Acaricidal action

*Phaseolus vulgaris* (plants) were infested, 12 hours before the test for acaricidal action, with an infested piece of leaf from a mass culture of *Tetranychus urticae*. The transferred mobile stages were sprayed with the emulsified test preparations from a chromatography-sprayer in a manner ensuring no running off to the spray liquor. An assessment was made after 2 to 7 days, by examination under a binocular, of the living and of the dead larvae, adults and eggs, and the results expressed in percentages. The treated plants were kept during the "holding time" in greenhouse compartments at 25°C.

The compounds according to Example 1 were effective in the above test against adults, larvae and eggs of *Tetranychus urticae*.

EXAMPLE 7

Action against soil nematodes

In order to test the action against soil nematodes the active substances were added, in the concentration stated in each case, to soil infested with root-gall-nematodes (Meloidogyne arenaria), and the whole intimately mixed. In the one test series, tomato seedlings were planted immediately afterwards in the thus prepared soil, and in the other test series tomatoes were planted after a waiting time of 8 days.

For an assessment of the nematicidal action, the galls present on the roots were counted 28 days after planting and sowing, respectively.

The active substances according to Example 1 exhibited in this test a good action against *Meloidagyne arenaria*.

I claim:

1. A compound of the formula

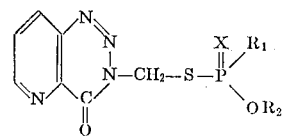

wherein
$R_1$ represents $C_1$–$C_6$-alkyl, $C_1$–$C_6$-alkoxy, $C_3$–$C_6$-alkenyloxy, $C_3$–$C_6$-alkynyloxy, $C_1$–$C_6$-alkoxy-$C_1$–$C_6$-alkoxy, halogeno-$C_1$–$C_6$-alkoxy, $C_1$–$C_6$-alkylthio, $C_3$–$C_6$-alkenylthio, $C_1$–$C_6$-alkoxy-$C_1$–$C_6$-alkylthio, $C_1$–$C_6$-alkylthio-$C_1$–$C_6$-alkylthio, phenyl, amino, $C_1$–$C_6$-alkylamino or di-$C_1$–$C_6$-alkylamino,
$R_2$ represents $C_1$–$C_6$-alkyl, $C_3$–$C_6$-alkenyl, $C_3$–$C_6$-alkynyl, $C_1$–$C_6$-alkoxy-$C_1$–$C_6$-alkyl or halogeno-$C_1$–$C_6$-alkyl, and
X represents oxygen or sulphur.

2. A compound according to claim 1, wherein
$R_1$ represents $C_1$–$C_2$-alkyl, $C_1$–$C_3$-alkoxy, $C_1$–$C_4$-alkylthio, $C_1$–$C_2$-alkoxy-$C_1$–$C_3$-alkoxy, $C_1$–$C_2$-alkoxy-$C_1$–$C_3$-alkylthio, allylthio,
$R_2$ represents $C_1$–$C_3$-alkyl, $C_1$–$C_2$-alkyloxy-$C_1$–$C_3$-alkyl, and
X represents oxygen or sulphur.

3. A compound according to claim 2, wherein
$R_1$ represents methoxy, ethoxy or $C_1$–$C_3$-alkylthio,
$R_2$ represents methyl or ethyl, and
X represents oxygen or sulphur.

4. Compound according to claim 3 of the formula

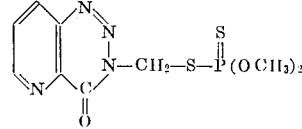

5. Compound according to claim 3 of the formula

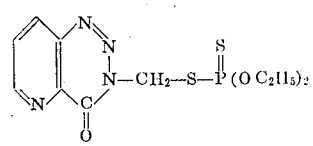

6. Compound according to claim 3 of the formula

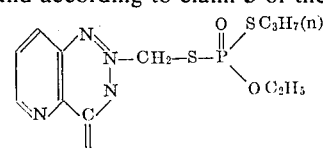

* * * * *